United States Patent [19]

Williams

[11] Patent Number: 5,822,746
[45] Date of Patent: Oct. 13, 1998

US005822746A

[54] METHOD FOR MAPPING A FILE SPECIFICATION TO A SEQUENCE OF ACTIONS

[75] Inventor: Ross Neil Williams, Hazelwood Park, Australia

[73] Assignee: Trustus Pty Ltd, Adelaide, Australia

[21] Appl. No.: 525,280

[22] Filed: Jul. 5, 1995

[30] Foreign Application Priority Data

Jul. 5, 1994 [AU] Australia ............................. 66169/94

[51] Int. Cl.$^6$ ................................................ G06F 17/30
[52] U.S. Cl. ............................................................. 707/1
[58] Field of Search ............................... 395/600; 707/1, 707/7, 100–102, 104

[56] References Cited

U.S. PATENT DOCUMENTS

| | | | |
|---|---|---|---|
| 5,276,860 | 1/1994 | Fortier et al. | 395/182.04 |
| 5,276,867 | 1/1994 | Kenley et al. | 395/620 |
| 5,495,603 | 2/1996 | Fruchtman et al. | 395/616 |
| 5,600,828 | 2/1997 | Johnson et al. | 395/601 |

*Primary Examiner*—Maria N. Von Buhr

[57] ABSTRACT

A method for mapping a file specification to a sequence of zero or more actions. A file specification consists of any finite string of bits that provides information about the identity of a file in a computer's file system. An action can be any process that effects a change upon the computer system containing the file. The mapping method involves sequentially applying a list of pattern/action rules, with each rule's action being executed if the rule's pattern matches the file specification. Upon completion, the series of actions that has been executed is the sequence of actions corresponding to the file specification.

10 Claims, 1 Drawing Sheet

METHOD FOR MAPPING A FILE SPECIFICATION TO A SEQUENCE OF ACTIONS

FIELD OF THE INVENTION

The present invention relates to the management of files in a file system on a computer system. Modern computer systems can contain thousands, or sometimes hundreds of thousands, of files, all of which have to be managed. The present invention provides a method for classifying and managing the files in complex ways based upon their file specifications.

BACKGROUND OF THE INVENTION

The present invention is a method comprising the following steps:
  Matching of patterns.
  Execution of actions.
  Processing of a series of productions (pattern/action rules).

Each of these steps are known and used in various forms. However, this combination of steps has not been used to associate a sequence of actions with a file specification.

PATTERN MATCHING: Pattern matching is a mature field and various operating systems support the use of patterns as a means of specifying a subset of the set of files in a file system.

ACTIONS: Actions are any process performed by a computer.

PATTERN/ACTION RULES: A number of systems exist for the execution of a list of pattern/action rules. Examples are: the SNOBOL programming language, the Unix AWK utility, and many expert systems.

The combination of the steps described provides a very large amount of aggressive power previously unavailable to the management of files in a file system.

SUMMARY OF THE INVENTION

The invention comprises the application of a list of productions to a particular file specification so as to yield a sequence of actions. A production consists of a pattern/action pair. Thus a list of productions takes the form:

| pattern1 | → | action1 |
| pattern2 | → | action2 |
| pattern3 | → | action3 |
| pattern4 | → | action4 |
| ... | ... | ... |
| patternN | → | actionN | where pattern1 . . . patternN are the patterns of the N productions, and action1 . . . action N are the actions of the N productions. Application of the list of productions to a file specification (referred to as the target file computer) consists of processing each production in sequence, such processing consisting of executing the production's action only if the production's pattern matches the target file specification. When a production's pattern matches and its action is executed, the production is said to have "fired".

In a variant of the method, processing stops as soon as the first production fires.

Each of the components of the method will now be described in more detail.

File Specifications

A file specification is any description that serves to partly or fully identify a particular file in a file system. File specifications are typically expressed as a sequence of characters. In its most general form, a file specification is a block of zero or more bytes. Such a block (or string) can usually be decomposed into components and in the following example of a VMS file specification,

"D1:[SLOTH.WALRUS.AARDVARK]TEAPOT.DAT;5"

the five components are given as:

| A device. | D1: |
| A directory. | [SLOTH..WALRUS.AARDVARK] |
| An identifier. | TEAPOT |
| An extension. | .DAT |
| A version. | ;5 |

The NAME in a file specification is everything to the right of the directory component. In this case the name is the concatenation of the identifier, extension, and version.

Some of these components may be absent under some file systems. Furthermore, the set of characters that are permitted in each component varies from operating system to operating system. Here are some examples of file specifications expressed in the syntax required by a variety of popular operating systems:

Unix: /sloth/walrus/emu/teapot
  VMS: D1:[SLOTH.WALRUS.EMU]TEAPOT.TXT;38
  MSDOS: C:\SLOTH\WALRUS\EMU\TEAPOT.TXT
  Macintosh: HD:sloth:walrus:emu:teapot The diversity of syntactic forms means that it is sometimes desirable to transform the file specification into an operating-system independent form such as:

(("sloth","walrus","emu"),"teapot")

Clearly there will be difficulties mapping the specifications of the different operating systems to such forms without losing information, but in some applications, the effort is useful so as to provide portability.

Patterns

A pattern specifies a not-necessarily-strict subset of a set of entities. In the context of file specifications, patterns are typically represented as a string of zero or more bytes, most of which must correspond to an identical byte in the target specification, but some of which have a special meaning that allows them to match a set of strings. These special bytes (or byte sequences) are called WILDCARDS. Examples of commonly used wildcards are:

%—Matches a single byte.
  *—Matches zero or more bytes.

The exact set of wildcards provided in a particular pattern matching scheme depends entirely on the kinds of file specifications to which the patterns will be applied.

In the context of matching file specifications, there is a need to separate the matching of the directory specification from the matching of the rest of the file specification components. This can be done by introducing specific wildcards for this purpose:

/—Matches the division between two directory path components.
  #—Matches zero or more directory path components.

This leads to patterns such as:

"/sloth/*.dat"—Matches any file with an extension of ".dat" in the directory "sloth" in the root directory.
  "#walrus#*"—Matches any file residing in a directory that has "walrus" as a component of its directory path.

However, ultimately, the nature of the pattern depends on the nature of the objects being matched. This patient seeks neither to claim nor to restrict the methods used to perform pattern matching.

Actions

Actions can consist of any operation of a computer device and so the processing of a list of productions can have any effect. However, in practice, the set of actions that is expressible in any particular computer device's environment, expressed for convenience as an embodiment, will relate to the problem at hand, which is likely to be something to do with files. In particular, embodiments can be classified into two groups: those whose actions are irreversible, and those whose actions are reversible.

Embodiments with reversible actions can be considered to be mapping a file specification to one value of a set of values. Embodiments with irreversible actions are better considered to be mapping a file specification to a list of actions.

The expressive power of a set of actions in a set of productions depends entirely on the domain over which they are allowed to operate. Here are some examples of common domains:

A BOOLEAN VALUE: If the domain is a single global boolean variable, then only three actions are possible: set to TRUE, set to FALSE, or DO NOTHING. With a boolean domain, the method can be considered to be mapping a file specification to a boolean result. The boolean domain could be useful for specifying a subset of the set of specifications. For example, the subset could be the set of files to be saved on tape during a backup operation.

A SET: If the domain is a set, then actions can consist only of adding and removing members from the set. In this case, the method could be considered to be mapping a file specification to a set. The set domain could be useful where a set of indicators must be turned on or off for each file. For example, if the set elements were file attributes, such a set could be used to specify the set of attributes to be saved on tape during a backup operation.

A GROUP OF VARIABLES: If the domain is a group of variables, then actions can consist only of modifying the values of these variables. In this case, the method could be considered to be mapping a file specification to a vector of variable values. The group-of-variables domain could be useful where attribute values must be specified for each file. For examples, if one of the variables held the type of a file, then the method could be used to specify the type of each of a group of files.

AN ARBITRARY DATA STRUCTURE: In general, the domain could be organized to be any data structure at all.

An alternative to actually executing actions is to convert each of the actions in the productions into actions that append a DESCRIPTION of the action then replaced onto the end of a list of actions. Then after all the productions have fired, the result is not the execution of a sequence of actions, but a list describing the sequence of actions.

BRIEF DESCRIPTION OF THE INVENTION

Figure 1:
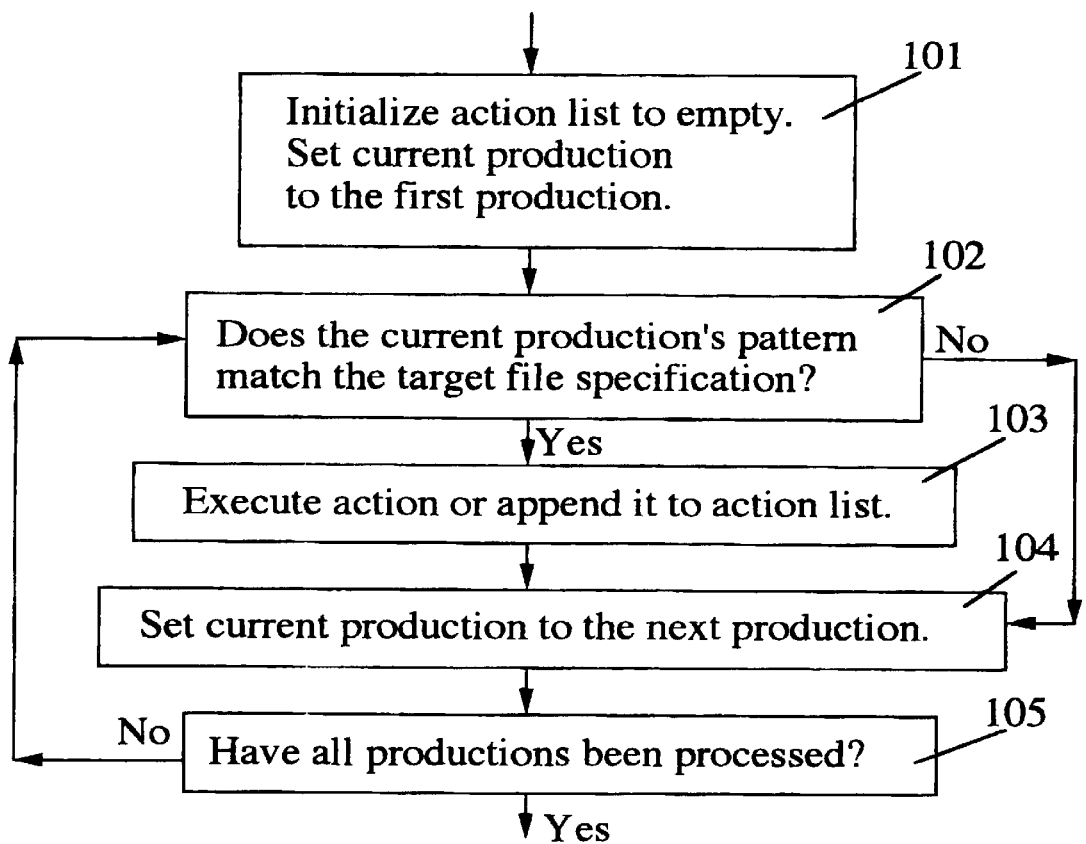
FIG. 1 depicts a flowchart of the preferred embodiment of the instant method for mapping a file specification to a finite sequence of actions.

In a broad aspect of the invention, a mapping method that maps a file specification to a finite sequence of actions using a fine list of productions, each production consisting of a pattern and an action, the method, shown in FIG. 1, comprising the steps of:

a) setting the current production to the first production in the list of productions (101);

b) matching the current production's pattern with a target file specification (102);

c) if the matching of step b succeeded, executing the current production's action (103);

d) setting the current production to the next production in the list of productions (104);

e) repeating steps b through d until all productions have been processed (105).

In a further aspect of the invention, a further mapping method is as described above but step e is:

e) if the production of b did not fire, go back to step b if there are any more productions in the list.

In yet a further aspect of the invention, a mapping method is in accordance with either of the methods described above where each action in step c consists only of the modification of zero or more values of a set of zero or more variables.

In a further aspect of the invention, a mapping method is in accordance with either of the methods described above where each action in step c consists only of the addition or subtraction of members from a set.

In a further aspect of the invention, a mapping method is in accordance with either of the methods described above where each action consists only of the setting or resetting of a boolean variable.

In a further aspect of the invention, a mapping method is in accordance with either of the methods described above where the pattern defines constraints not only on the file specification, but on one or more attributes of the file as well.

DETAILED DESCRIPTION OF A PREFERRED EMBODIMENT

This section contains a detailed description of some embodiments of the invention. However, these embodiments should not be interpreted as a limitation on the scope of the claims of this patent. Because the invention is orientated towards providing improvements in semantic expressiveness rather than linear performance, generally no embodiment is better than any other. However, one particular implementation method can improve the speed of the method in some applications, and this is described. In addition, a particular embodiment of the invention is described by way of example.

The implementation method that improves performance relates to the use of the invention to map not just one file specification to a sequence of actions, but a related group of such file specifications. Typically such related groups occur when a group of files within the same directory in a file system must be processed. The implementation method that can speed up the execution of the method is to match the directory specification components of the file specifications and patterns separately from their name specification components. This eliminates the work of having to compare the directory specification component of the pattern of each production to the directory specification component of each file in a directory, where all of these components are identical.

Example: consider the case where the list of productions

"#wombat#*.exe"→+B.md5

"#wombat/goanna#*.dat"→+R.md5

"#sloth#*.txt"→+T.md5 must be applied to the list of files aardvark.txt
   walrus.exe
   zebra.dat residing in the directory whose path is "/root/wombat/goanna/". A straightforward embodiment of the invention would require that all three productions be applied to all three file specifications. However, by splitting the path and name components of the patterns and files, we can first match "#wombat#" and "#wombat/goanna#" and "#sloth#" with "/root/wombat/goanna/" and thus determine that only the first two productions can ever match the specifications of the files in the target directory.

The first two productions then form a subset of the set of productions, and only this subset need then be applied to the target file specifications. In fact, only the non-directory components of the patterns of the selected patterns need be matched with the non-directory components of the target files, as it is already known that the directory specifications match. This technique can be applied for any kind of file specification whose components can be decomposed into independent parts. To a lesser extent, it can be applied even to components that are dependent.

We now describe in detail an example embodiment of the invention. In this embodiment, each file specification is transformed into a normal form that is used for matching. The normal form consists of the original string of bytes except that the bytes representing the divisions between directory path components are replaced by an abstract marker M which could be represented by a particular byte, or implicitly by storing the string as a list of path component patterns, with the last pattern component corresponding to the file name.

In this embodiment, a pattern consists of a string of zero or more bytes each of which consists of a number in the range "0,255]. Scanning from left to right, each byte matches an identical byte in the target file specification, except for the following special characters and backslash (\) sequences. By TOKEN is meant either an M or a byte.

/—Matches M.

—Matches a string of one or more tokens beginning and ending with M.

*—Matches zero or more tokens not containing M.

%—Matches a single token that is not M.

&—Toggles case sensitivity.

\/—Matches the byte '/'.

\#—Matches the byte '#'.

\*—Matches the byte '*'.

\%—Matches the byte '%'.

\&—Matches the byte '&'.

\\—Matches the byte '\'.

\x[??]—x can be in upper or lower case.
   each ? must be an upper or lower case hex digit.
   Matches the single ASCII byte described by the two hex digits.

(No other backslash sequences are allowed or valid).

(This example does not address the pattern matching of devices).

The pattern matcher can match case-sensitively or case-insensitively. The & character is used to toggle this mode. At the start of the pattern, the mode is case-sensitive. A pattern must match the entirely of the target specification with which it is being compared for it to be successfully matched.

Example: The VMS file name:

[SLOTH.WALRUS.AARDVARK]ZEBRA.DAT;4 can be viewed as:

M "SLOTH" M "WALRUS" M "AARDVARK" M "ZEBRA.DAT;4"

This file specification would match or not match the following patterns:

Match:
   "#*"
   "#WALRUS#*"
   "#walrus#zebra*"
   "/SLOTH/WALRUS#*;4"

No match:
   "#"
   "#walrus#zebra/"

The action component of this example embodiment depends on the applicaton of the method. In this case we choose the application of mapping a file specification to a set of attributes. This embodiment could be useful for enabling a user to specify the attributes of a file that are to be saved during a backup or snapshot operation. For the purposes of example, we define just three attributes:

date—The creation date of the file.
   checksum—The checksum of the contents of the file.
   length—The number of bytes in the file.

An action could then consist of a list of "commands" each of which adds an attribute to the set or removes an attribute from the set of attributes of the target file specification. For example, to add the date attribute and remove the checksum attribute, the action might be specified as: "+date −checksum".

Example: The following list of productions:

"/SLOTH#*"→+date +checksum
   "#WALRUS#ZEBRA.DAT;%"→−date
   "#X#ZEBRA.DAT;%"→+length is applied to the file specification

"[SLOTH.WALRUS.AARDVARK]ZEBRA.DAT;4"

The first two productions fire, but the third does not, yielding the attribute set: {checksum}.

The above embodiments of the invention have been described in detail so as to provide a disclosure of at least one of the forms of the invention. However, the detailed description above is not intended in any way to limit the scope of the broad features and principles of the invention. The scope of the invention is defined only by the following claims.

I claim:

1. A mapping method that maps a file specification to a finite sequence of two or more actions using a finite list of two or more productions, each production consisting of a pattern and an action, such that the list comprises at least two different actions, said method comprising the steps of:

a) setting the current production to the first production in the list of productions, and setting said sequence of actions to empty;

b) matching the current production's pattern with a target file specification;

c) if the matching of step b succeeded, executing the current production's action, or appending the action to said sequence of actions;

d) setting the current production to the next production in the list of productions;

e) repeating steps b through d until all productions have been processed.

2. A mapping method in accordance with claim 1 wherein step e is:

e) if the production of b did not fire, go back to step b if there are any more productions in the list.

3. A mapping method in accordance with claim 1 wherein each action in step c consists only of the modification of one or more values of a set of one or more variables.

4. A mapping method in accordance with claim 2 wherein each action in step c consists only of the modification of one or more components of a set of one or more variables.

5. A mapping method in accordance with claim 1 wherein each action in step c consists only of the addition or subtraction of members from a predefined set.

6. A mapping method in accordance with claim 2 wherein each action consists only of the addition or subtraction of members from a predefined set.

7. A mapping method in accordance with claim 1 wherein each action consists only of the setting or resetting of a boolean variable.

8. A mapping method in accordance with claim 2 wherein each action consists only of the setting or resetting of a boolean variable.

9. A mapping method in accordance with claim 1 wherein the pattern defines constraints not only on the file specification, but on one or more attributes of the file as well.

10. A mapping method in accordance with claim 2 wherein each pattern defines constraints not only on the file specification, but on one or more attributes of the file as well.

* * * * *